United States Patent
Chou et al.

(10) Patent No.: US 7,335,538 B2
(45) Date of Patent: Feb. 26, 2008

(54) METHOD FOR MANUFACTURING BOTTOM SUBSTRATE OF LIQUID CRYSTAL DISPLAY DEVICE

(75) Inventors: Weng-Bing Chou, Tao Yuan Shien (TW); Ko-Ching Yang, Tao Yuan Shien (TW)

(73) Assignee: AU Optronics Corporation, Hsin-chu (TW)

( * ) Notice: Subject to any disclaimer, the term of this patent is extended or adjusted under 35 U.S.C. 154(b) by 0 days.

(21) Appl. No.: 11/476,158

(22) Filed: Jun. 28, 2006

(65) Prior Publication Data

US 2007/0020822 A1    Jan. 25, 2007

(51) Int. Cl.
*H01L 21/00* (2006.01)

(52) U.S. Cl. .................. 438/149; 438/390; 438/240; 257/E21.287; 257/E21.29; 257/E21.291; 257/E27.115; 257/E29.202; 257/E31.126; 349/50; 349/51

(58) Field of Classification Search .............. 438/39, 438/149, 240; 257/E21.29, E21.291, E21.287, 257/E27.115, E29.202, E31.126; 349/50, 349/51
See application file for complete search history.

(56) References Cited

U.S. PATENT DOCUMENTS

| | | | | |
|---|---|---|---|---|
| 4,534,623 A | * | 8/1985 | Araki | 349/51 |
| 4,653,858 A | * | 3/1987 | Szydlo et al. | 349/50 |
| 5,893,621 A | * | 4/1999 | Sekiguchi | 349/51 |
| 6,341,005 B1 | * | 1/2002 | Tanaka et al. | 349/149 |
| 2004/0189885 A1 | * | 9/2004 | Song | 349/50 |
| 2005/0105010 A1 | * | 5/2005 | Oh et al. | 349/50 |

FOREIGN PATENT DOCUMENTS

| | | |
|---|---|---|
| CN | 1470927 | 1/2004 |
| JP | 08-032045 | 2/1996 |
| JP | 8320495 | 12/1996 |
| JP | 08320495 A * | 12/1996 |
| WO | WO 2004006016 A2 * | 1/2004 |

OTHER PUBLICATIONS

Zhang et al., A Novel Self-Aligned Bidirectional MIM Diode with Transparent Junction for AM-LCD's, IEEE Electron Device Letters, vol. 19, No. 6, Jun. 1998, pp. 192-194.*

* cited by examiner

*Primary Examiner*—B. William Baumeister
*Assistant Examiner*—Peniel M Gumedzoe
(74) *Attorney, Agent, or Firm*—Bacon & Thomas PLLC

(57) ABSTRACT

A method for manufacturing liquid crystal display substrates comprises the steps of: (a) providing a substrate having a transparent electrode layer and a metal layer; (b) forming a patterned photoresist layer through half-tone or diffraction; (c) defining signal line area and thin film diode area, or pixel area and conductive electrode-lines by etching; and (d) forming an oxidized layer on partial surface of the metal layer. The disclosure here provides a patterning process of lithography and etching with one photolithography of one single mask in the manufacturing of liquid crystal display substrates. Furthermore, the method disclosed here can effectively increase the yield of manufacturing, and reduce the cost of manufacturing.

10 Claims, 4 Drawing Sheets

(a)

(b)

(c)

(d)

(e)

(f)

METHOD FOR MANUFACTURING BOTTOM SUBSTRATE OF LIQUID CRYSTAL DISPLAY DEVICE

BACKGROUND OF THE INVENTION

1. Field of the Invention

The present invention relates to a method for manufacturing an LCD device substrate, and, more particularly, to a method for manufacturing a thin film diode substrate of a liquid crystal display device having thin film diode arrays.

2. Description of Related Art

Currently, the active matrix liquid crystal display (LCD) devices are the main products of the flat panel display devices. In the known method for manufacturing a thin film transistor (TFT) liquid crystal display device, the method including five photomasks (or photolithographical steps) is frequently used. Actually, most of the current TFT liquid crystal display devices are produced by methods including four to six photomasks. On the other hand, even though manufacturing methods comprising less than four photomasks are suggested, those methods are not used or approved in the mass-production of TFT liquid crystal display devices. Furthermore, there is another option for the bottom substrate of an active matrix LCD, i.e. the thin film diode (TFD) bottom substrate. The TFD bottom substrate for the active matrix LCD has market potential since the process of manufacturing the LCD devices is relatively simple. Moreover, the cost for the apparatus for manufacturing a TFD-LCD device is relatively low.

Many problems for the manufacturing-process generate as the size of the manufactured LCD device increases. For example, the yield of manufacturing is low for large-sized panels. For the manufacturing process of the TFD-LCD devices, the decreasing of the number of the photomask means effective saving for the time, and indicates significant reducing of the cost.

Taking the process for manufacturing the bottom substrate of the TFD-LCD device for example, the common number of the used photomask is three, especially for the bottom substrate with silicon nitride ($SiN_x$) insulation. In most cases, the first photomask is used to pattern the conductive metal layer and the bottom metal of the thin film diode. The second photomask is used to form the patterned insulation layer of the diode. The third photomask is used to form the display area and the upper metal of the diode. The product can be seen in FIG. 1. As shown in FIG. 1, signal lines S1, S2, thin film diodes 100, and display areas 200 are formed through the method illustrated above. On the other hand, a method for forming thin film diodes through anode oxidation is disclosed in the prior art JP080-32045. The thin film diode is formed by depositing a $Ta_2O_5$ insulation on the tantalum layer in the prior art. Through the steps illustrated above, only two photomasks are required for manufacturing.

Even though the number of the photomask is not high, however, a process with lower number of photomask is still needed for simplifying the manufacturing process, and reducing the cost for manufacturing.

Therefore, it is desirable to provide an improved method to mitigate the afore-mentioned problems.

SUMMARY OF THE INVENTION

A method for manufacturing the LCD device substrate is disclosed. The method is achieved by using one photomask including photolithography and etching processes to complete the manufacturing of the LCD device substrate. Through the method, the yield can be effectively increased.

The method of the present invention for manufacturing a LCD device substrate, comprising following steps: (a) providing a substrate having a transparent electrode layer and a metal layer; wherein the transparent electrode layer is located between the substrate and the metal layer; (b) forming a patterned photoresist having a first thickness and a second thickness; (c) etching the patterned photoresist, the transparent electrode layer, and the metal layer over the substrate to define signal lines, thin film diode areas, pixel area, and conductive electrode-lines; wherein the thin film diode area has the transparent electrode layer, the metal layer, and a gap; and (d) forming an oxidized layer on partial surface of the metal layer; wherein the gap of the thin film diode is filled with the oxidized layer.

The transparent electrode layer can be any conventional transparent conductive material of the art. Preferably, the transparent electrode layer is indium tin oxide (ITO) or indium zinc oxide (IZO). The metal layer on the substrate is not limited. Preferably, the metal layer is tantalum (Ta) layer. The formation of the patterned photoresist in step (b) is not limited. Preferably, the patterned photoresist is formed through halftone or diffraction in step (b). In addition, the part of the photoresist of the first thickness is preferably corresponding to the area for forming the signal lines, and that for forming thin film diode areas in step (b).

The etching for defining the signal lines, thin film diode areas, pixel area, and conductive electrode-lines in step (c) can be any conventional etching. Preferably, the etching is wet etching or dry etching. An additional $O_2$ ashing can be further performed after etching to enhancing the etching if the etching is wet etching. The sequence of the formation of the signal lines, the thin film diode areas, the pixel area, and the conductive electrode-lines are not limited. Preferably, the pixel area, and the conductive electrode-lines are formed after the formation of the signal lines, and the thin film diode areas are completed. The conductive electrode-lines are connected with the terminal lines of the periphery of the substrate (outside the active area of the LCD device substrate). The IC outside the active area is electrically connected with the conductive electrode-lines through the connection of the terminal lines.

The oxidized layer in step (d) can be formed through any conventional process. Preferably, the oxidized layer is formed through anode oxidation in step (d). Basically, the gap of the thin film diode is filled with the oxidized layer. Since the gap is filled with the oxidized layer, a connecting structure of metal-insulation-metal (MIM) is formed. In addition, the oxidation can be selected according to the metal layer in step (d). In the preferred embodiment of the present invention, the oxidized layer is $Ta_2O_5$ in step (d).

Other objects, advantages, and novel features of the invention will become more apparent from the following detailed description when taken in conjunction with the accompanying drawings.

DETAILED DESCRIPTION OF THE PREFERRED EMBODIMENT

The patterning process of the method of the present invention is a combination of techniques of partial exposure, etching, and anode oxidation. Through the combination illustrated above, a bottom substrate of a liquid crystal display device can be made through one photomask. The partial exposure of the present invention is preferably performed through halftone masks. The halftone mask includes transparent areas, half-transparent areas, and non-transparent areas. The non-transparent areas are corresponding to the thick photoresist areas on the substrate in future. The half-transparent areas are corresponding to the thin photoresist areas or the cavity areas on the substrate in future.

Figure 1:
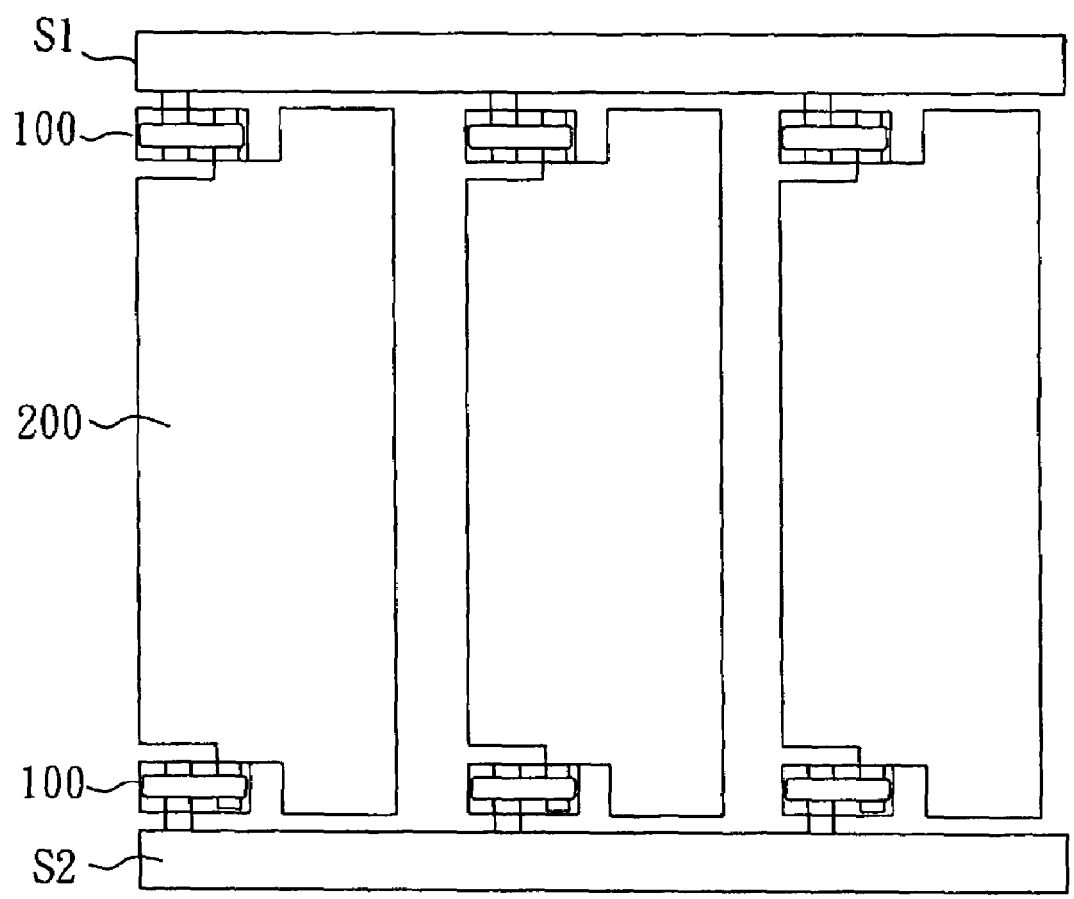
FIG. 1 is a top view of the structure of the thin film diode of a bottom substrate of a liquid crystal display of a prior art.
Figure 2:
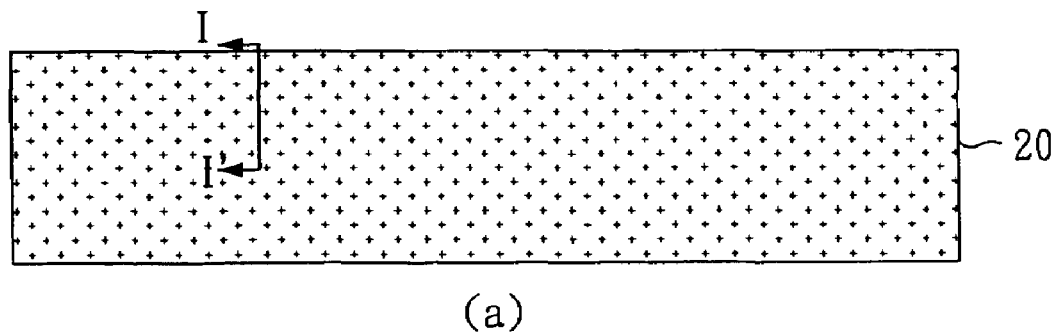
FIG. 2 (a) to 2 (f) are top views of the structure of the thin film diode areas of a bottom substrate of a liquid crystal display device of the present embodiment.
Figure 2:
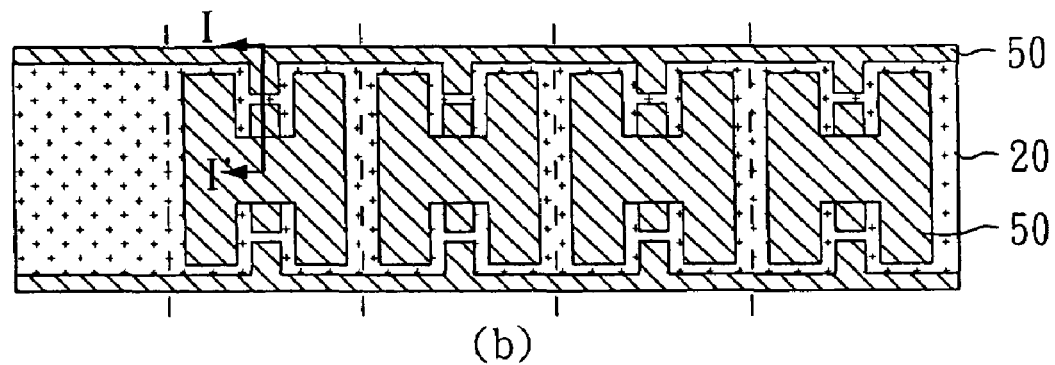
Figure 2:
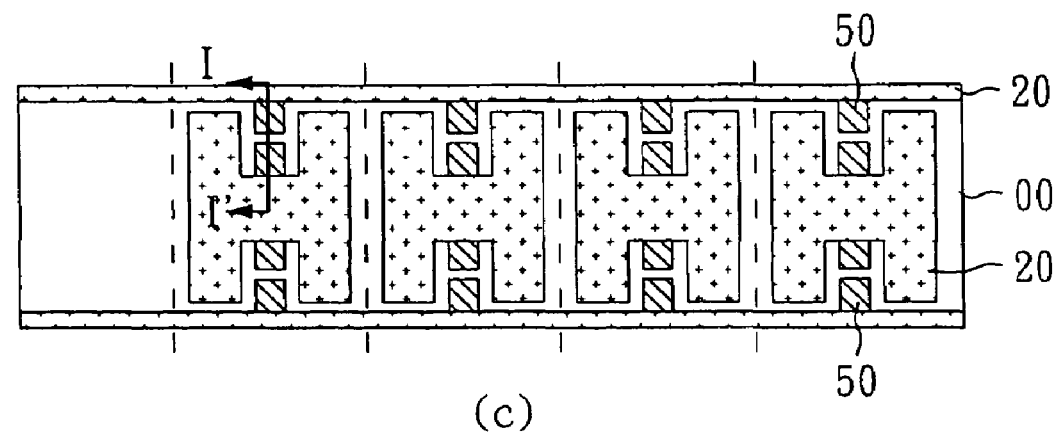
Figure 2:
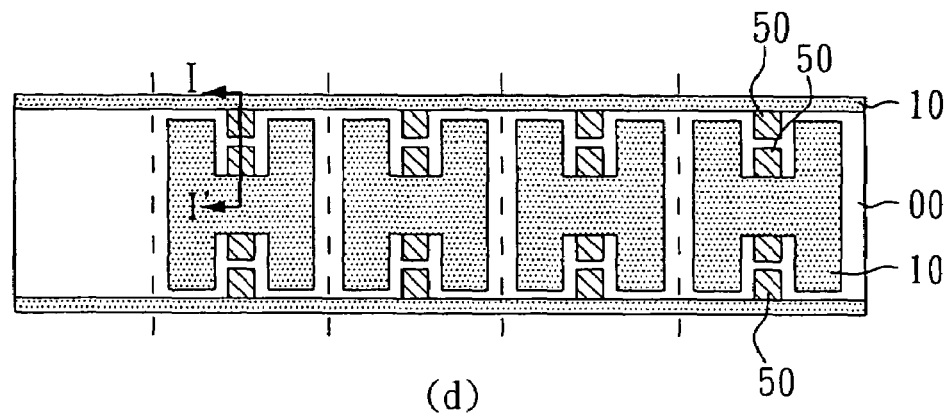
Figure 2:
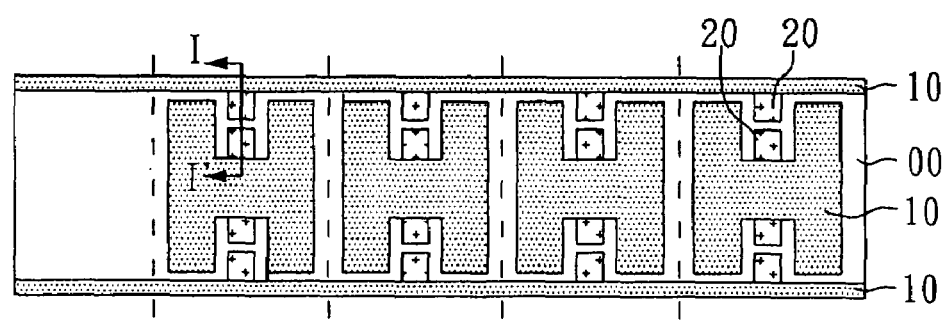
Figure 2:
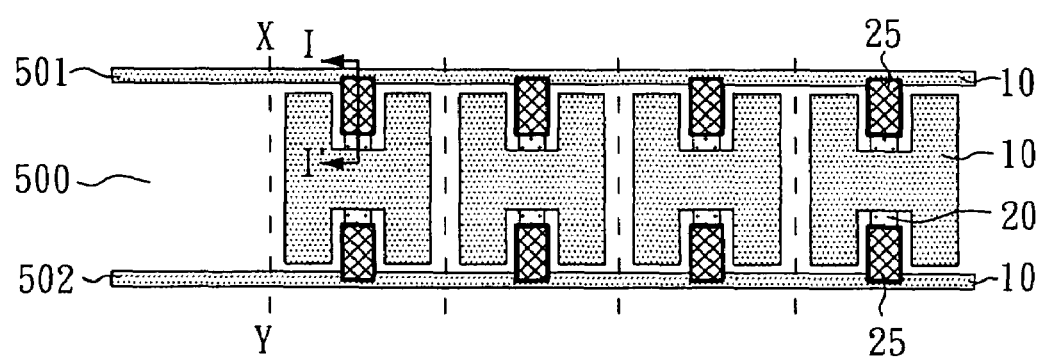

The FIG. 2 (a) to FIG. 2 (f) are the top views of the patterns of the steps of the method of the present invention. The FIG. 3 (a) to FIG. 3 (f) are the cross section view of the I-I' line part marked in FIG. 2. For clearly illustrating the method of the present embodiment, the pattern in FIG. 2 is divided into four areas and marked with A, B, C, and D.

Figure 3:
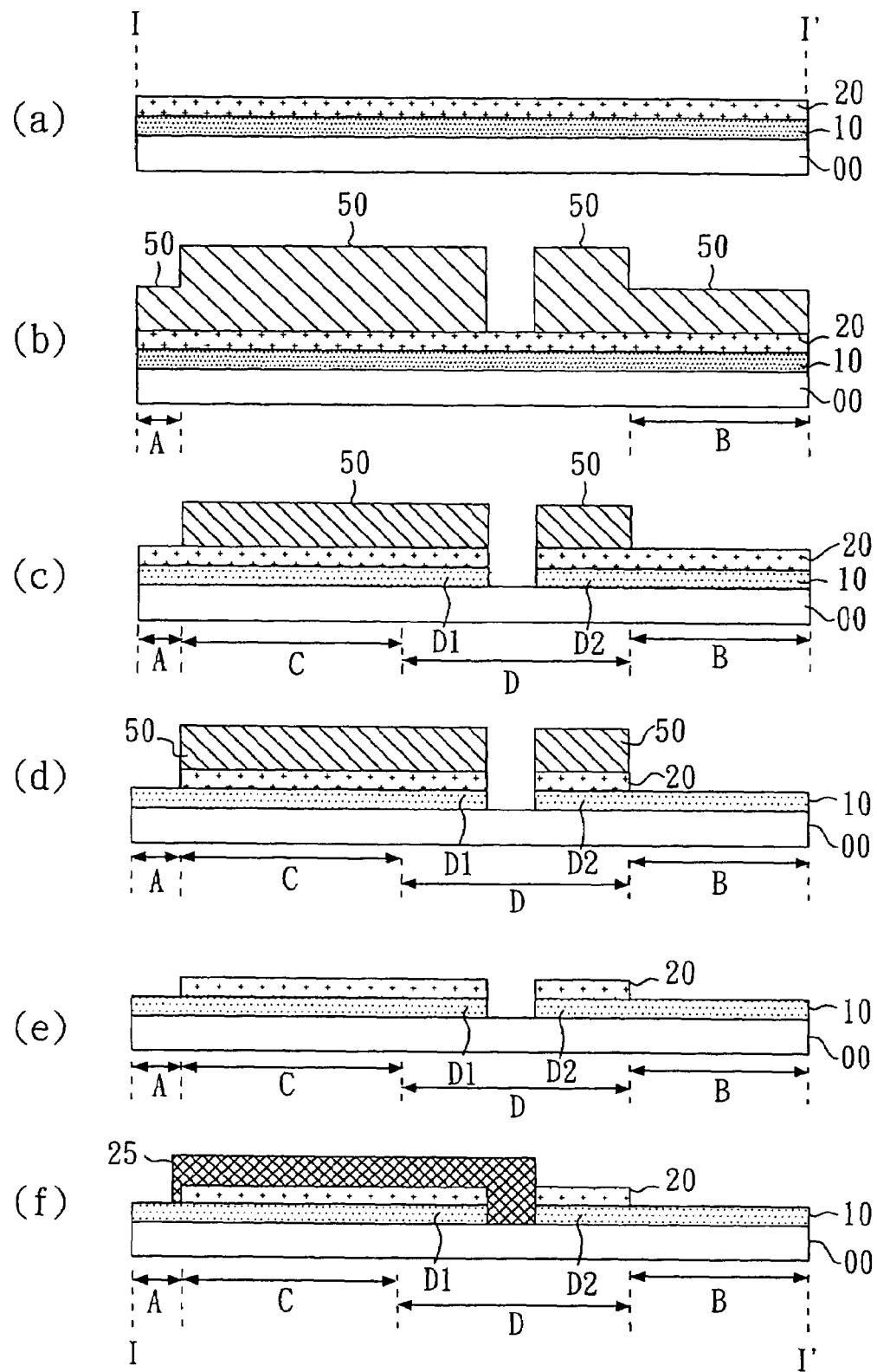
FIG. 3 (a) to 3 (f) are cross section views of the structure of the thin film diode areas of a bottom substrate of the liquid crystal display device of the present embodiment.

The method is performed by forming an indium tin oxide (ITO) layer 10 and a tantalum layer 20 over a glass substrate 00 first as shown in FIG. 2 (a) and FIG. 3 (a). A photoresist 50 is coated and exposed through a halftone mask. In the meantime, the ITO pixel areas B and the conductive electrode-lines A are partially exposed. Other alternative of the partial exposure for forming the patterned photoresist of ITO pixel areas B and that of the conductive electrode-lines A is diffraction. However, the mask for diffraction is different from that of halftone. After further development is achieved, the thickness of the photoresist 50 on the ITO pixel area B or that of the conductive electrode-lines A is one third to half of the thickness of the normal photoresist on signal line C or on the thin film diode areas D (see FIG. 2 (b) and FIG. 3 (b)).

A first etching process is performed after the development of the photoresist. The ITO layer 10 and the tantalum layer 20 are etched to define the signal line C and the thin film diode areas D. Since the thickness of the photoresist on the ITO pixel areas B and on the conductive electrode-lines A is thinner than that of the signal line C and the thin film diode areas D, the photoresist on the ITO pixel areas B and on the conductive electrode-lines A will be completely removed. At the same time, two terminal sections D1, and D2 of conductive layers with a gap are formed in each thin film diode area D (see FIG. 2 (c) and FIG. 3 (c)). The two terminal sections D1, and D2 can be the conductive area of a MIM diode in future. If the etching is wet etching, the photoresist on the ITO pixel areas B and on the conductive electrode-lines A can be further removed through $O_2$ sintering.

After the first etching process is completed, a second etching process is further performed. The second etching process is performed to remove the tantalum layer 20 on the ITO pixel areas B and on the conductive electrode-lines A. The ITO layer 10 on the ITO pixel areas B and on the conductive electrode-lines A remains to defined the pattern of the ITO pixel areas B and on the conductive electrode-lines A (see FIG. 2 (d) and FIG. 3 (d)).

Moreover, the remained photoresist is stripped out to complete the formation of the patterns of the conductive electrode-lines A, the ITO pixel areas B, the signal line C, and terminal sections D1, and D2 of the future thin film diode areas D (see FIG. 2 (e) and FIG. 3 (e)).

Then a direct current voltage is applied to the processed substrate for oxidizing the tantalum layer 20 on the lines C, and that between the terminal sections D1, and D2 through anode oxidation. An oxidized layer such as $Ta_2O_5$ layer 25 is formed on the lateral surface and the top surface of the terminal section D1. The $Ta_2O_5$ layer 25 on the surfaces of the terminal sections D1 keeps growing in oxidation and finally touches, and combines the tantalum layer 20 on the other terminal section D2. After the gap of the terminal sections D1, and D2 is filled with the oxidized layer, the structure of the thin film diode, i.e. Ta/$Ta_2O_5$/Ta, is completed (see FIG. 2 (f) and FIG. 3 (f)).

The left side of the X-Y dashed line is the non-active area 500 (i.e. area not for displaying). The terminal lines 501, and 502 are electrically connected with the extended conductive electrode-lines A. The terminal lines 501, and 502 are extending to electrically connect with the pads of an IC (not shown in the FIGS.) in the non-active area.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a bottom substrate of a liquid crystal display device, comprising the following steps:
   (a) providing a substrate having a transparent electrode layer and a metal layer; wherein the transparent electrode layer is located between the substrate and the metal layer;
   (b) forming a patterned photoresist on the metal layer, wherein the patterned photoresist has a first thickness and a second thickness;
   (c) etching the patterned photoresist, the transparent electrode layer, and the metal layer over the substrate to define a signal line, a thin film diode area, a pixel area, and a conductive electrode-line; wherein the thin film diode area has the transparent electrode layer, the metal layer, and a gap; and
   (d) forming an oxidized layer on partial surface of the metal layer; wherein the gap of the thin film diode is filled with the oxidized layer.

2. The method as claimed in claim 1, wherein the transparent electrode layer in step (a) is indium tin oxide or indium zinc oxide.

3. The method as claimed in claim 1, wherein the metal layer is tantalum layer.

4. The method as claimed in claim 1, wherein the patterned photoresist is formed through halftone or diffraction.

5. The method as claimed in claim 1, wherein the part of the photoresist of the first thickness is corresponding to the area for forming the signal lines, and that for forming thin film diode areas.

6. The method as claimed in claim 1, wherein the etching is dry etching.

7. The method as claimed in claim 1, wherein the etching is wet etching.

8. The method as claimed in claim 7, further comprising ashing the photoresist and the substrate having the transparent electrode layer and the metal layer by $O_2$ ashing after wet etching in step (c).

9. The method as claimed in claim 1, wherein the oxidized layer is formed through anode oxidation in step (d).

10. The method as claimed in claim 1, wherein the oxidized layer is $Ta_2O_5$ in step (d).

* * * * *